United States Patent
Buer et al.

(10) Patent No.: US 7,568,110 B2
(45) Date of Patent: *Jul. 28, 2009

(54) CRYPTOGRAPHY ACCELERATOR INTERFACE DECOUPLING FROM CRYPTOGRAPHY PROCESSING CORES

(75) Inventors: Mark Buer, Gilbert, AZ (US); Donald P. Matthews, Morgan Hill, CA (US)

(73) Assignee: Broadcom Corporation, Irvine, CA (US)

(*) Notice: Subject to any disclaimer, the term of this patent is extended or adjusted under 35 U.S.C. 154(b) by 596 days.

This patent is subject to a terminal disclaimer.

(21) Appl. No.: 10/350,902

(22) Filed: Jan. 23, 2003

(65) Prior Publication Data

US 2004/0123119 A1 Jun. 24, 2004

Related U.S. Application Data

(60) Provisional application No. 60/434,745, filed on Dec. 18, 2002.

(51) Int. Cl.
*G06F 11/30* (2006.01)
*H04L 9/00* (2006.01)
*H04L 12/28* (2006.01)

(52) U.S. Cl. .................. 713/189; 713/153; 713/187; 370/389

(58) Field of Classification Search .......... 713/189, 713/153, 187; 370/389
See application file for complete search history.

(56) References Cited

U.S. PATENT DOCUMENTS

| | | |
|---|---|---|
| 4,491,909 A | 1/1985 | Shimizu |
| 4,774,706 A | 9/1988 | Adams |
| RE33,189 E | 3/1990 | Lee et al. |
| 5,161,193 A | 11/1992 | Lampson et al. |
| 5,297,206 A | 3/1994 | Orton |
| 5,329,623 A | 7/1994 | Smith et al. |
| 5,365,589 A | 11/1994 | Gutowitz |
| 5,471,482 A | 11/1995 | Byers et al. |
| 5,631,960 A | 5/1997 | Likens et al. |
| 5,734,829 A | 3/1998 | Robinson |
| 5,751,809 A | 5/1998 | Davis et al. |
| 5,796,744 A | 8/1998 | Krawczak et al. |

(Continued)

FOREIGN PATENT DOCUMENTS

EP 0876026 A2 11/1998

(Continued)

OTHER PUBLICATIONS

Erich Nahum, David J. Yates, Sean O'Malley, Hilarie Orman, and Richard Schroeppel; "Parallelized Network Security Protocols"; 1996 IEEE; pp. 145-154.

(Continued)

*Primary Examiner*—Emmanuel L Moise
*Assistant Examiner*—Techane J Gergiso
(74) *Attorney, Agent, or Firm*—Sterne Kessler Goldstein & Fox, PLLC

(57) ABSTRACT

Methods and apparatus are provided for decoupling a cryptography accelerator interface from cryptographic processing cores. A shared resource is provided at the cryptography accelerator interface having multiple input ports. References to data in the shared resource are provided to allow processing and ordering of data in preparation for processing by cryptographic processing cores without substantial numbers of separate buffers in the cryptographic processing data paths.

21 Claims, 10 Drawing Sheets

U.S. PATENT DOCUMENTS

| | | | |
|---|---|---|---|
| 5,796,836 | A | 8/1998 | Markham |
| 5,809,147 | A | 9/1998 | De Lange et al. |
| 5,867,706 | A | 2/1999 | Martin et al. |
| 5,870,474 | A | 2/1999 | Wasilewski et al. |
| 5,870,479 | A | 2/1999 | Feiken et al. |
| 5,933,503 | A | 8/1999 | Schell et al. |
| 5,936,967 | A | 8/1999 | Baldwin et al. |
| 5,943,338 | A | 8/1999 | Duclos et al. |
| 5,949,881 | A * | 9/1999 | Davis .................. 713/189 |
| 5,953,416 | A * | 9/1999 | Hasebe et al. ............ 713/189 |
| 5,983,350 | A | 11/1999 | Minear et al. |
| 6,003,135 | A | 12/1999 | Bialick et al. |
| 6,038,551 | A | 3/2000 | Barlow et al. |
| 6,069,957 | A | 5/2000 | Richards |
| 6,101,255 | A | 8/2000 | Harrison et al. |
| 6,111,858 | A | 8/2000 | Greaves et al. |
| 6,115,816 | A | 9/2000 | Davis |
| 6,157,955 | A | 12/2000 | Narad et al. |
| 6,189,100 | B1 | 2/2001 | Barr et al. |
| 6,216,167 | B1 | 4/2001 | Momirov |
| 6,226,710 | B1 | 5/2001 | Melchior |
| 6,269,163 | B1 | 7/2001 | Rivest et al. |
| 6,295,602 | B1 | 9/2001 | Weissman et al. |
| 6,295,604 | B1 | 9/2001 | Callum |
| 6,320,964 | B1 * | 11/2001 | Callum ........................ 380/29 |
| 6,327,625 | B1 | 12/2001 | Wang et al. |
| 6,349,405 | B1 | 2/2002 | Welfeld |
| 6,378,072 | B1 * | 4/2002 | Collins et al. ............ 713/187 |
| 6,393,026 | B1 | 5/2002 | Irwin |
| 6,393,564 | B1 | 5/2002 | Kanemitsu et al. |
| 6,421,730 | B1 | 7/2002 | Narad et al. |
| 6,477,646 | B1 * | 11/2002 | Krishna et al. ............ 713/189 |
| 6,484,257 | B1 | 11/2002 | Ellis |
| 6,493,347 | B2 | 12/2002 | Sindhu et al. |
| 6,529,508 | B1 | 3/2003 | Li et al. |
| 6,701,432 | B1 | 3/2004 | Deng et al. |
| 6,704,871 | B1 | 3/2004 | Kaplan et al. |
| 6,708,273 | B1 * | 3/2004 | Ober et al. ................ 713/189 |
| 6,751,677 | B1 | 6/2004 | Ilnicki et al. |
| 6,751,728 | B1 | 6/2004 | Gunter et al. |
| 6,760,444 | B1 | 7/2004 | Leung |
| 6,778,495 | B1 | 8/2004 | Blair |
| 6,791,947 | B2 | 9/2004 | Oskouy et al. |
| 6,807,183 | B1 | 10/2004 | Chow et al. |
| 6,831,979 | B2 | 12/2004 | Callum |
| 6,862,278 | B1 | 3/2005 | Chang et al. |
| 6,909,713 | B2 * | 6/2005 | Magnussen et al. ........ 370/389 |
| 6,963,979 | B2 * | 11/2005 | Fairclough et al. .......... 713/189 |
| 6,981,140 | B1 | 12/2005 | Choo |
| 6,983,366 | B1 | 1/2006 | Huynh et al. |
| 6,983,374 | B2 | 1/2006 | Hashimoto et al. |
| 6,996,842 | B2 | 2/2006 | Strahm et al. |
| 7,003,118 | B1 * | 2/2006 | Yang et al. .................. 380/287 |
| 7,005,733 | B2 | 2/2006 | Kommerling et al. |
| 7,017,042 | B1 * | 3/2006 | Ziai et al. .................... 713/161 |
| 7,020,137 | B2 | 3/2006 | Kadambi et al. |
| 7,039,641 | B2 | 5/2006 | Woo |
| 7,055,029 | B2 | 5/2006 | Collins et al. |
| 7,062,657 | B2 | 6/2006 | Law |
| 7,086,086 | B2 | 8/2006 | Ellis |
| 7,191,341 | B2 | 3/2007 | Paaske et al. |
| 7,266,703 | B2 | 9/2007 | Anand et al. |
| 2002/0001384 | A1 * | 1/2002 | Buer et al. ..................... 380/30 |
| 2002/0004904 | A1 * | 1/2002 | Blaker et al. ................ 713/190 |
| 2002/0009076 | A1 | 1/2002 | Engbersen et al. |
| 2002/0039418 | A1 | 4/2002 | Dror et al. |
| 2002/0044649 | A1 | 4/2002 | Gallant et al. |
| 2002/0057796 | A1 | 5/2002 | Lambert et al. |
| 2002/0078342 | A1 | 6/2002 | Matthews, Jr. |
| 2002/0085560 | A1 | 7/2002 | Cathey et al. |
| 2002/0097724 | A1 * | 7/2002 | Halme et al. ................ 370/392 |
| 2002/0108048 | A1 | 8/2002 | Qi et al. |
| 2002/0165718 | A1 | 11/2002 | Graumann et al. |
| 2002/0191790 | A1 * | 12/2002 | Anand et al. ................ 380/255 |
| 2003/0005144 | A1 | 1/2003 | Engel et al. |
| 2003/0014627 | A1 * | 1/2003 | Krishna et al. ............. 713/153 |
| 2003/0023846 | A1 | 1/2003 | Krishna et al. |
| 2003/0041252 | A1 | 2/2003 | Fung et al. |
| 2003/0046423 | A1 * | 3/2003 | Narad et al. ................ 709/238 |
| 2003/0084308 | A1 | 5/2003 | Van Rijnswou |
| 2003/0084309 | A1 * | 5/2003 | Kohn ........................ 713/189 |
| 2004/0039936 | A1 * | 2/2004 | Lai ............................ 713/201 |
| 2004/0054914 | A1 | 3/2004 | Sullivan |
| 2004/0083375 | A1 | 4/2004 | Foster et al. |
| 2004/0098600 | A1 | 5/2004 | Eldeeb |
| 2004/0123096 | A1 | 6/2004 | Buer et al. |
| 2004/0123120 | A1 | 6/2004 | Buer et al. |
| 2004/0123123 | A1 | 6/2004 | Buer et al. |

FOREIGN PATENT DOCUMENTS

| | | |
|---|---|---|
| EP | 1132800 A2 | 9/2001 |
| WO | WO 01/80483 A2 | 10/2001 |
| WO | WO 02/41599 A1 | 5/2002 |

OTHER PUBLICATIONS

Krishna et al., "Classification Engine in a Cryptography Acceleration Chip", U.S. Appl. No. 09/610,722, filed Jul. 6, 2000, 43 pgs.

Krishna et al., "Distributed Processing in a Cryptography Acceleration Chip", U.S. Appl. No. 09/610,798, filed Jul. 6, 2000, 44 pgs.

Deepakumara, J. et al., "FPGA Implementation of MD5 Hash Algorithm," *Conference Proceedings of the Canadian Conference on Electrical and Computer Engineering*, vol. II, pp. 919-924, May 13-16, 2001.

Burnside, M. and Keromytis, A.D., "Accelerating Application-Level Security Protocols," *The 11th IEEE International Conference on Networks*, pp. 313-318, Sep. 28-Oct. 1, 2003.

Jiang, S. et al., "Securing Web Servers against Insider Attack," *Proceedings 17th Annual Computer Security Applications Conference*, pp. 265-276, Dec. 10-14, 2001.

"Server ECS", Mar. 9, 1998, [Retrieved from Internet Sep. 2, 2004], "http://home.expertcanmore.net/expert/servers.htm".

IPSec Overview, Jun. 5, 2001, [Retrieved from Internet Sep. 2, 2004], "http://forsitesolutions.com/Techstuff/freeswan/inside_overview.html.".

"RFC 2402", Oct. 1998, [Retrieved from Internet Sep. 3, 2004], "http://www.ietf.org/rfc/rfc2402.txt?number=2402".

*Secure Products VMS115*, VLSI Technology, Inc., Printed in USA, Document Control: VMS115, VI, 0, Jan. 1999, pp. 1-2.

*VMS 115 Data Sheet*, VLSI Technology, Inc., a subsidiary of Philips Semiconductors, Revision 2:3, Aug. 10, 1999, pp. 1-64.

*Data Sheet 7751 Encryption Processor*, Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, S. and Jacobson, V., "Random Early Detection Gateways for Congestion Avoidance", *IEEE/ACM Transactions on Networking*, vol. 1, No. 4, Aug. 1993, pp. 397-413.

Egevang, K. and Francis, P., "The IP Network Address Translator (NAT)", Network Working Group, Request for Comments: 1631, May 1994, pp. 1-10.

Pall, G. S. and Zorn, G., "Microsoft Point-to Point Encryption (MPPE) Protocol", Microsoft Corporation, Network Working Group, Internet Draft, Updates: RFC 2118, Oct. 1999, pp. 1-12.

Deutsch, P., "DEFLATE Compressed Data Format Specification Version 1.3", Aladdin Enterprises, Network Working Group, Request for Comments: 1951, May 1996, pp. 1-17.

Kent, S. and Atkinson, R., "IP Authentication Header", Network Working Group, Request for Comments: 2402, printed from http://www.ietf.org/rfc/rfc2402.txt?number=2402, Nov. 1998, 21 pages.

Kent, S. and Atkinson, R., "IP Encapsulating Security Payload (ESP)", Network Working Group, Request for Comments: 2406, printed from http:www.ietf.org/rfc/rfc2406.txt?number=2406, Nov. 1998, 21 pages.

Maughan, D. et al., "Internet Security Association and Key Management Protocol (ISAKMP)", Network Working Group, Request for Comments: 2408, Nov. 1998, pp. 1-20.

Harkins, D. et al., "The Internet Key Exchange (IKE)", Cisco Systems, Network Working Group, Request for Comments: 2409, Nov. 1998, pp. 1-12.

Srisuresh, P., "Security Model with Tunnel-mode IPsec for NAT Domains", Lucent Technologies, Network Working Group, Request for Comments: 2709, Oct. 1999, pp. 1-11.

Shenker, S. et al., "Specification of Guaranteed Quality of Service", Network Working Group, Request for Comments: 2212, Sep. 1997, pp. 1-20.

Srisuresh, P. and Holdrege, M., "IP Network Address Translator (NAT) Terminology and Considerations", Lucent Technologies, Network Working Group, Request for Comments: 2663, Aug. 1999, pp. 1-30.

Kent, S., and Atkinson, R., "Security Architecture for the Internet Protocol", Network Working Group, Request for Comments: 2401, Nov. 1998, pp. 1-66.

*Compression for Broadband Data Communications*, BlueSteel Networks, Inc., Sep. 8, 1999, pp. 1-9.

*Securing and Accelerating e-Commerce Transactions*, BlueSteel Networks, Inc., Revision 2.0, Oct. 20, 1999, pp. 1-7.

*Securing Broadband Communications*, By BlueSteel Networks, Inc., Sep. 8, 1999, pp. 1-10.

Keromytis, A.D. et al., "Implementing IPsec", *Global Telecommunications Conference (Globecom)*, IEEE, Nov. 3, 1997, pp. 1948-1952.

Pierson, L.G. et al., "Context-Agile Encryption for High Speed Communication Networks", *Computer Communications Review*, Association for Computing Machinery, vol. 29, No. 1, Jan. 1999, pp. 35-49.

Sholander, P. et al.,. "The Effect of Algorithm-Agile Encryption on ATM Quality of Service", *Global Telecommunications Conference (Globecom)*, IEEE, Nov. 3, 1997, pp. 470-474.

Smirni, E. et al., "Evaluation of Multiprocessor Allocation Policies", Technical Report, Vanderbilt University, Online, 1993, pp. 1-21.

Tarman, T.D. et al., "Algorithm-Agile Encryption in ATM Networks", *IEEE Computer*, Sep. 1998, vol. 31, No. 1, pp. 57-64.

Wassal, A.G. and Hasan, M.A., "A VLSI Architecture for ATM Algorithm-Agile Encryption", *Proceedings Ninth Great Lakes Symposium on VLSI*, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3, printed from http://content.analog.com/pressrelease/prdisplay/0,1622,16,00.html.

3Com: "3Com Launches New Era of Network Connectivity", 3Com Press Release, Jun. 14, 1999, pp. 1-3.

*Analog Devices: ADSP2141 SafeNetDPS User's Manual*, Revision 6, Analog Devices Technical Specifications, Mar. 2000, XP002163401, pp. i-v and 1-82.

Madson, C. and Glenn, R., "RFC 2403- The Use of HMAC-MD5-96 within ESP and AH", IETF Request for Comments: 2403, Nov. 1998, printed from http://csrc.nist.gov/ipsec/papers/rfc2403-hmacmd5.txt, 7 Pages.

Kent, S. and Atkinson, R., "RFC 2406-IP Encapsulating Security Payload (ESP)", IETF Request for Comments: 2406, Nov. 1998, Retrieved from the Internet and Mar. 20, 2001, http://www.faqs.org/rfcs/frc2406.html, 5 Pages.

Sedgewick, R., *Algorithms in C—Third Edition*, 1998, Addison Wesley, XP002163543, pp. 573-608.

Schneider, B., *Applied Cryptography*, Second Edition, 1996, John Wiley & Sons, New York, cited in the application, p. 442, paragraph 18.7—p. 445 (pp. 436-445 enclosed).

Stallings, W., "SHA: The Secure Hash Algorithm,"*Dr. Dobb's Journal*, Apr. 1994, pp. 32 and 34.

European Search Report, from European Patent Appl. No. 03029195.9, 3 pages, dated Nov. 2, 2005.

Final Rejection completed for U.S. Appl. No. 10/350,907 by Examiner Zachary A. Davis, mailed on Aug. 15, 2008, 17 pages.

* cited by examiner

CRYPTOGRAPHY ACCELERATOR INTERFACE DECOUPLING FROM CRYPTOGRAPHY PROCESSING CORES

CROSS REFERENCE TO RELATED APPLICATIONS

This application claims priority under U.S.C. 119(e) from U.S. Provisional Application No. 60/434,745, filed Dec. 18, 2002, Entitled: Methods And Apparatus For Cryptography Accelerator Data Handling, by Mark Buer and Donald P. Matthews, the entirety of which is incorporated by reference for all purposes. The present application is also related to concurrently filed U.S. patent application Ser. No. 10/351,258 entitled Methods And Apparatus For Ordering Data In A Cryptography Accelerator, by Tim Paaske and Mark Buer, U.S. patent application Ser. No. 10/350,907 entitled Cryptography Accelerator Input Interface Data Handling, by Mark Buer and Don Matthews, and U.S. patent application Ser. No. 10/350,922, entitled Cryptography Accelerator Data Routing Unit, by Mark Buer and Don Matthews, the entireties of which are incorporated by reference for all purposes.

BACKGROUND OF THE INVENTION

1. Field of the Invention

The present application relates to cryptography accelerators. More specifically, the present application relates to methods and apparatus for data handling in cryptography accelerators.

2. Description of Related Art

Conventional cryptography accelerators include a variety of mechanisms for managing the exchange of data with external devices. In many conventional implementations, specialized data handling mechanisms are configured for specific ports. Port buffers are preconfigured based on expected needs and requirements of particular ports and data path buffers are provided for implementation of cryptographic operations.

Mechanisms for performing cryptographic operations are described in Applied Cryptography, Bruce Schneier, John Wiley & Sons, Inc. (ISBN 0471128457), incorporated by reference in its entirety for all purposes. However, implementation of specialized data handling mechanisms for specific ports and providing buffers throughout a cryptography accelerator causes a variety of inefficiencies including data handling inefficiencies and inflexibility in managing different types of data.

It is therefore desirable to provide methods and apparatus for improving data handling with respect to some or all of the performance limitations noted above.

SUMMARY OF THE INVENTION

Methods and apparatus are provided for decoupling a cryptography accelerator interface from cryptographic processing cores. A shared resource is provided at the cryptography accelerator interface having multiple input ports. References to data in the shared resource are provided to allow processing and ordering of data in preparation for processing by cryptographic processing cores without substantial numbers of separate buffers in the cryptographic processing data paths.

In one embodiment, a cryptography accelerator is provided. The cryptography accelerator includes a plurality of input ports, a data input unit input controller, and policy security association lookup circuitry. The data input unit input controller is coupled to the plurality of input ports. The data input unit input controller is configured to write data blocks from the plurality of input ports into an input buffer and write entries corresponding to the data blocks into a buffer pointer table. Policy security association lookup circuitry is configured to receive header information and determine policy and security association information associated with the data blocks. The policy and security association information is forwarded with the data blocks to cryptographic processing cores.

In another embodiment, a method for data handling in a cryptography accelerator is provided. A plurality of data sequences is received at one of a plurality of input ports. The plurality of data sequences are into a shared resource. References to the data sequences are provided in the shared resource. The references identify the data sequences as well as the type of the data sequences. A policy security association lookup is performed to determine policy and security association information associated with the data sequences. The plurality of data sequences are forwarded along with policy and security association information to cryptographic processing circuitry.

In another embodiment, a cryptography accelerator is provided. The cryptography accelerator includes a plurality of input ports, a shared input buffer, a buffer pointer table, and policy security association lookup circuitry. The plurality of input ports are configured to receive data comprising header information and data blocks from entities external to the cryptography accelerator. The shared input buffer is associated with the plurality of input ports. The shared input buffer is configured to hold data blocks from the plurality of input ports. A buffer pointer table is associated with the plurality of input ports. The buffer pointer table has a plurality of entries configured to hold header information from the plurality of input ports. The plurality of entries reference data blocks in the shared input buffer. Policy security association lookup circuitry is configured to receive header information and determine policy and security association information associated with the data blocks. The policy and security association information is forwarded with the data blocks to cryptographic processing cores.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present application relates to implementing a cryptography accelerator. More specifically, the present application relates to methods and apparatus for providing a cryptography accelerator capable of performing secure session operations.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a multiple port cryptography accelerator with multiple cores for performing particular cryptographic operations. However, it should be noted that the techniques of the present invention can be applied to a variety of different chip architectures that perform authentication and encryption operations in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
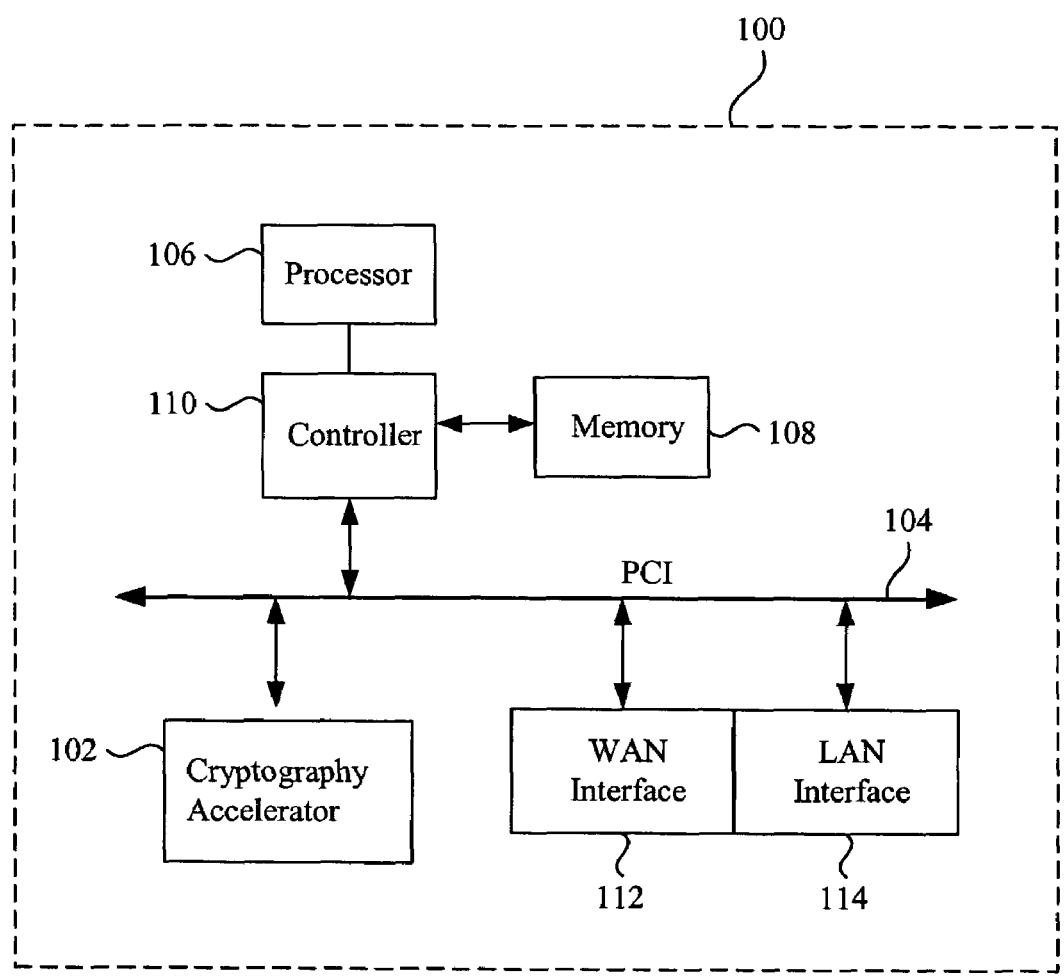
FIG. 1 is a diagrammatic representation of a system that can use the techniques of the present invention.

FIG. 1 is a diagrammatic representation of one example of a processing system 100 in accordance with an embodiment of the present invention. As shown in FIG. 1, the present invention may be implemented in a stand-alone cryptography accelerator 102 or as part of the system 100. Any logic, mechanism, or device operable to perform encryption, decryption, and/or authentication operations is referred to herein as a cryptography accelerator. In the described embodiment, the cryptography accelerator 102 is connected to a bus 104 such as a PCI bus via a standard on-chip PCI interface. The processing system 100 includes a processing unit 106 and a system memory unit 108. In typical implementations, the cryptography accelerator 102 includes multiple ports used for communication with external devices such as the processing unit 106 and system memory unit 108. The processing unit 106 and the system memory unit 108 are coupled to the system bus 104 via a bridge and memory controller 110.

Although the processing unit 106 may be the central processing unit (CPU) of a system 100, it does not necessarily have to be the CPU. It can be one of a variety of processors in a multiprocessor system. In one example, a LAN interface 114 is provided to couple the processing system 100 to a local area network (LAN) to allow packet receipt and transmission. Similarly, a Wide Area Network (WAN) interface 112 can also be provided to connect the processing system to a WAN (not shown) such as the Internet. The WAN interface manages in-bound and out-bound packets to allow automatic decryption and authentication processing.

According to various embodiments, the cryptography accelerator 102 is an application specific integrated circuit (ASIC) coupled to the processor 106. The cryptography accelerator 102 can also be a programmable logic device (PLD), field programmable gate array (FPGA), or other device coupled to the processor 106. According to specific embodiments, the cryptography accelerator 102 is implemented either on a card connected to the bus 104 or as a standalone chip integrated in the system 100.

In other embodiments, the cryptography accelerator 102 itself is integrated into the processing core of a CPU of system 100, such as that available from Tensilica Corporation of Santa Clara, Calif. or ARC Cores of San Jose, Calif. In another embodiment, techniques and mechanisms of the present invention are integrated into a CPU such as a CPU available from Intel Corporation of San Jose, Calif. or AMD Corporation of Sunnyvale, Calif. By implementing cryptography accelerator functionality entirely on the processor 106, a separate card or chip in the system 100 is not needed. In still other embodiments, the processing system 100 including the cryptography accelerator 102 is implemented as a system on a chip (SOC). The network interfaces, memory, processing core, and cryptography accelerator functionality are provided on a single integrated circuit device.

The cryptography accelerator 102 is capable of implementing various network security standards, such as Secure Sockets Layer/Transport Layer Security (SSL/TLS), which provide application-transparent encryption and authentication services for network traffic. Network security standards such as SSL/TLS provide authentication through the use of hash algorithms and encryption through the use of encryption algorithms. Two commonly used hash algorithms are MD5 and the Secure Hash algorithm (SHA-1). Other hash algorithms such as MD4 and MD2 are also available. Two commonly used encryption algorithms are DES and RC4. Other encryption algorithms such as triple DES are also available. Authentication and encryption algorithms are described in Applied Cryptography, Bruce Schneier, John Wiley & Sons, Inc. (ISBN 0471128457), incorporated by reference in its entirety for all purposes.

Figure 2:
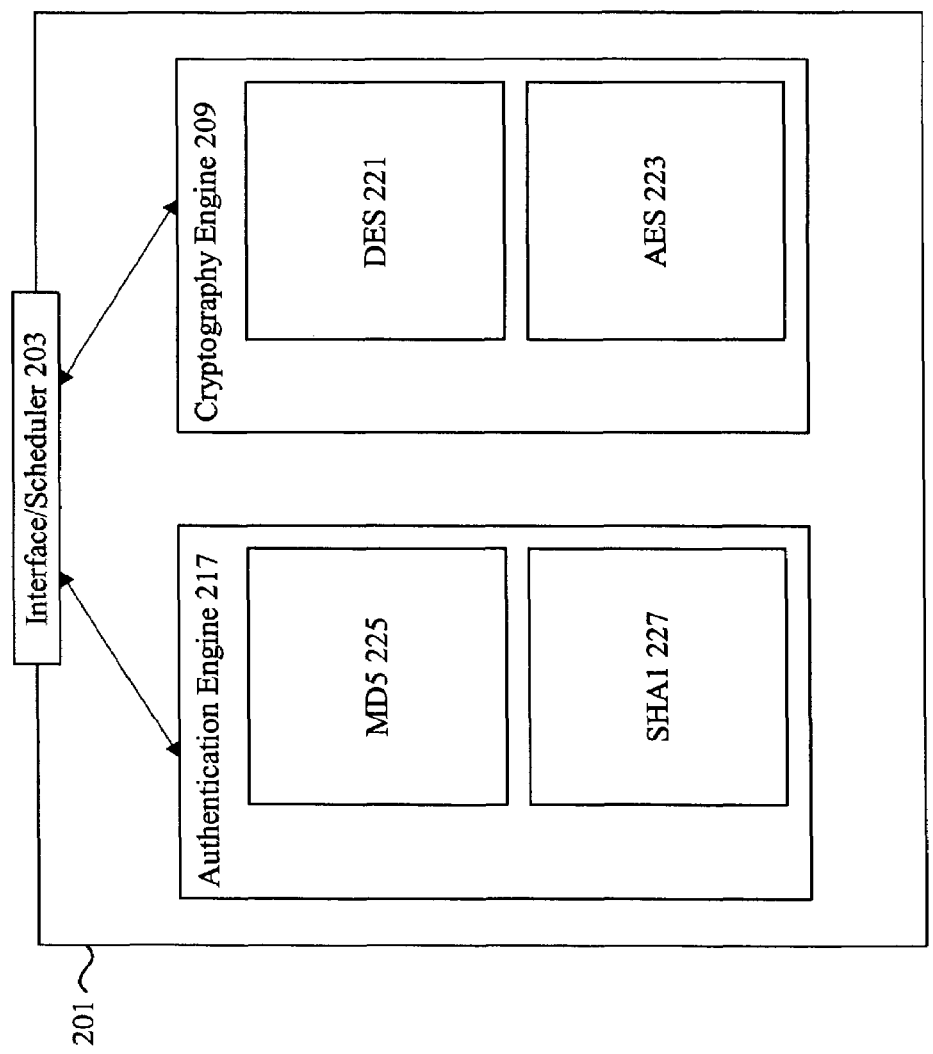
FIG. 2 is a diagrammatic representation of a cryptography accelerator containing processing cores and interfaces.

FIG. 2 is a diagrammatic representation of one example of a cryptography accelerator 201. The cryptography accelerator 201 includes an input interface 203 connected to a host such as an external processor. According to various embodiments, the interface 203 receives information from the host for processing and sends information to the host when processing is completed. In typical implementations, the input interface include multiple ports. Each of the different ports may be used to provide a different interface to an external resource such as a host or network card. In one example, one port is a streaming interface port configured to allow the input of data streams for processing in the cryptographic processing cores. Another port is a Gigabit MAC (media access control) interface configured to receive individual packets.

According to various embodiments, the Gigabit MAC provides packet processing such as collision detection, back pressure, and error detection for received data. In one example, another port is a memory mapped port allowing the cryptography accelerator to obtain data from memory associated with the host. Each of the different ports may include buffers of various sizes. In one example, the buffer size is determined based on the expected packet size. For example, much larger buffers would have to be provided to hold incoming traffic for ports supporting 9 k byte packets than for ports that support only 2 k byte packets. In conventional implementations, a system designer would estimate optimal buffer sizes for the various ports. However, because each port maintains its own buffer, inefficiencies in buffer allocation can occur. Some port buffers may be underutilized while other ports receiving a large amount of traffic may not have sufficient buffer space.

In typical implementations, small buffers are also provided in data paths associated with cryptographic processing cores 217 and 209. These buffers are typically required to store data for various cryptography operations along various data paths. Having a large number of separate, fixed sized buffers leads to inefficiencies in both chip design, cost, and resource allocation. Consequently, the techniques of the present invention provide mechanisms for efficiently allocating a shared memory resource that can be optimized for different ports as well as for data paths associated with cryptographic operations.

The shared resource allows the decoupling of the interface from the various cryptographic processing cores. In one example, shared buffers are provided in both input interface 203 and output interface (not shown). The shared resource can be allocated and reallocated based on the particular specifications of the input and output ports.

Figure 3:
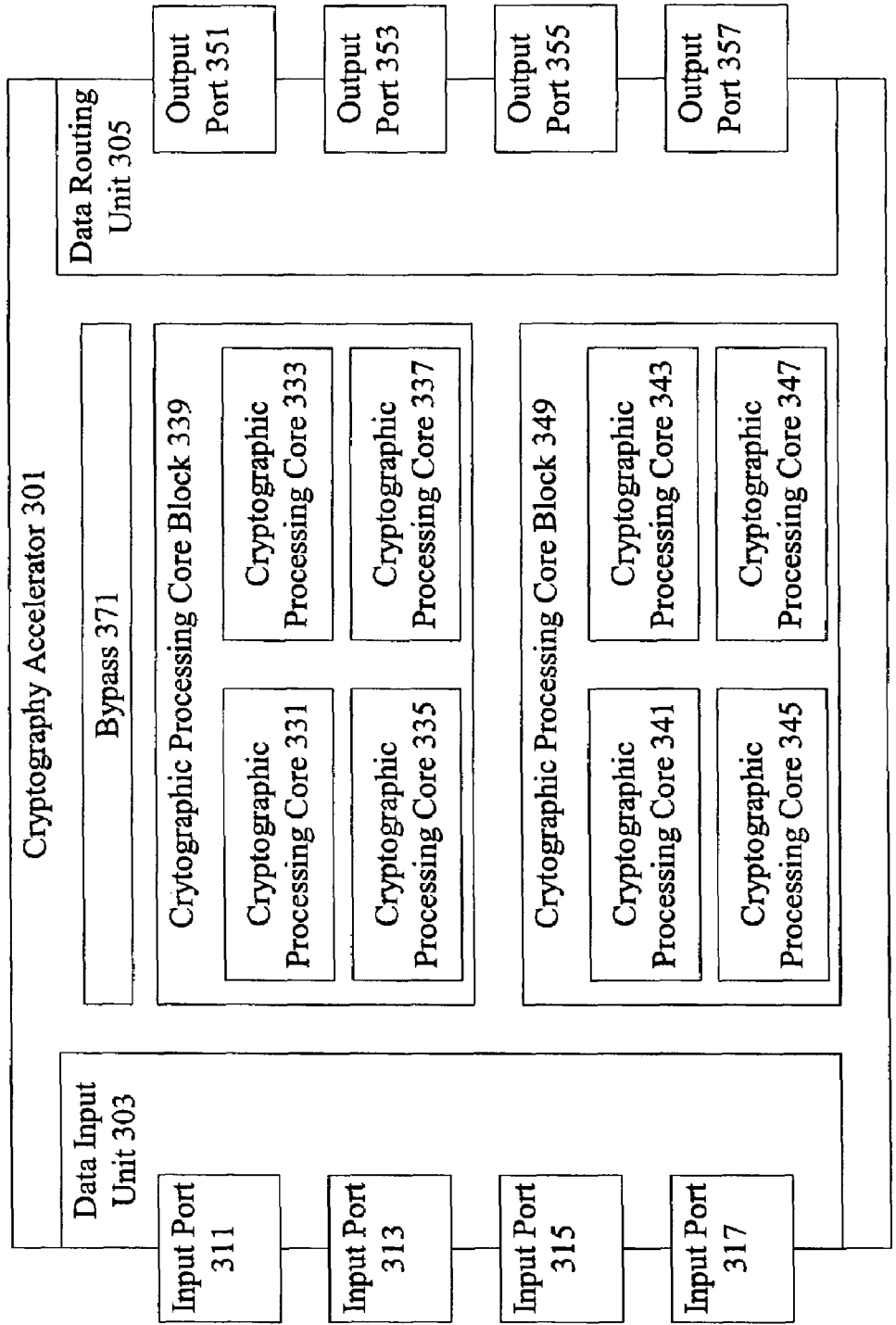
FIG. 3 is a diagrammatic representation of a cryptography accelerator having a data interface unit and a data routing unit.

FIG. 3 is a diagrammatic representation of one example of a cryptography accelerator having a shared resource. The cryptography accelerator 301 includes a data input unit 303 having multiple input ports 311, 313, 315, and 317. In one example, the data input unit 303 takes data in a round robin fashion from each of the four input ports. The data input unit 303 can then allocate space in a shared resource, here a shared input buffer, for each of the received data blocks. Information associated with the data, such as data length, packet type, start of packet information, end of packet information, and ordering information is also maintained based on the associated input port identified.

Using information associated with the data, the data input unit 305 can then determine how the data should be processed. In one example, the data may require no processing at all, and may be forwarded to a bypass line 371 to allow output of the data from the cryptography accelerator 301 with substantially no cryptographic operations performed on the data. In typical implementations, the cryptography accelerator 102 includes multiple ports used for communication with external devices such as the processing unit 106 and system memory unit 108.

In a similar manner, the data input unit 303 may determine that the data from one of the input ports should be processed using one of the cryptographic processing core data paths 331, 333, 335, 337, 341, 343, 345, and 347. Any mechanism shared by various input ports to buffer and distribute data to various cryptographic processing data paths is referred to herein as a data input unit. According to various embodiments, the data input unit 303 determines whether to forward data to cryptographic processing core blocks 339 or 349 based on load information.

The data input unit 303 is configurable to provide buffering for all the different data has in the device. As noted above, in typical implementations, individual buffers were provided not only for the various ports in a cryptography accelerator, but also for the various data paths in a device. According to various embodiments, a single shared resource is provided in the data input unit to provide for buffering the various ports in the cryptographic accelerator and the various data paths in the cryptography accelerator.

In some embodiments, the cryptography accelerator 301 also includes a data routing unit 305 having multiple output ports 351, 353, 355, and 357. Any mechanism shared by output ports to buffer cryptographically processed data is referred to herein as a data routing unit. According to various embodiments, the data routing unit manages the ordering and delay of the data targeted at the various output ports. In typical embodiments, individual buffers were also associated with each of the various output ports. However, the techniques of the present invention provide a shared resource for the various output ports. According to various embodiments, the various ports are not configured with fixed size buffers and each of the ports can be modified to accommodate different types of traffic based on user needs. In one example, a particular output port may be configured to handle large size packets by allocating more buffer space in the data routing unit shared resource to that particular port.

Figure 4:
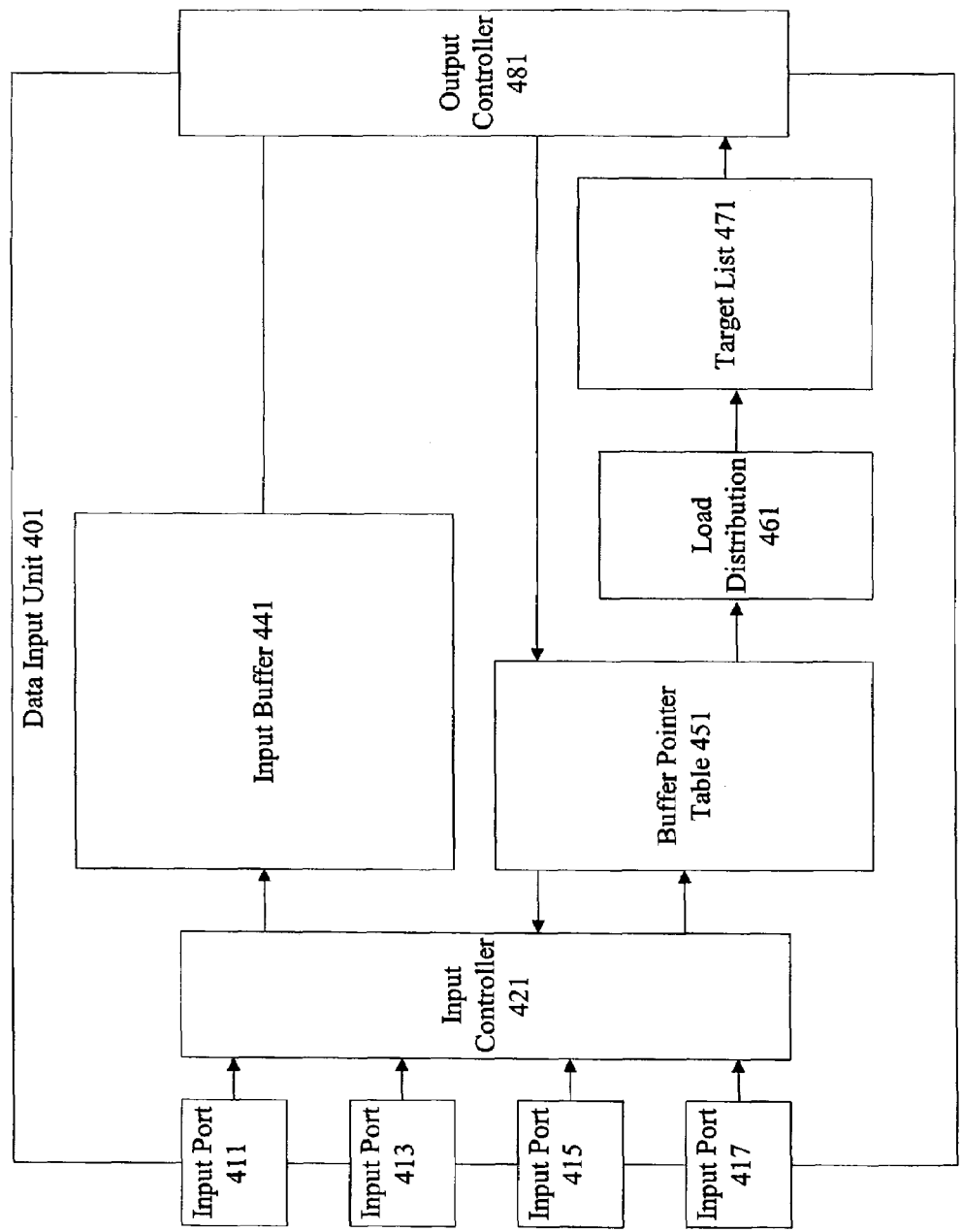
FIG. 4 is a diagrammatic representation showing a data input unit.

FIG. 4 is a diagrammatic representation showing more detail on one example of a data input unit 401. Data input unit 401 includes input ports 411, 413, 415, and 417. In one embodiment, the input controller 421 takes data from each of the four input ports in round robin fashion. The input controller 421 determines if any input buffer space is available for a particular port. In one example, input controller 421 determines if buffer space is available in input buffer 441 by examining buffer pointer table 451. Buffer pointer table 451 includes a list of pointers each associated with a block of memory in input buffer 441. In one instance, each pointer in the buffer pointer table 451 references a 128 byte chunk of memory in the input buffer 441. Consequently, it should be noted that the input buffer 441 does not have to be physically divided amongst the input ports in order to dynamically allocate buffer space for each of the various input ports. Although physically allocating the input buffer 441 to the various input ports is one possible mechanism for providing an allocable shared resource, the techniques of the present invention also provide for allocation of pointers to the input buffer 441.

According to various embodiments, blocks of pointers in the buffer pointer table 451 are allocated to the various input ports. The input controller 421 determines if any pointer associated with the input port is available. If a pointer associated with the input port is free or available, the data in the input port is forwarded to input buffer 441 and the pointer is assigned to the data block. In one implementation, an entry in the buffer pointer table 451 lists the free pointers available and their associated input ports. In another implementation, each entry is associated with a flag indicating if the pointer is being used and what port the pointer is associated with. If no pointers associated with the input port or available, the input controller does not hold data from the input port, as all buffer space allocated to the input port has been consumed. Any mechanism for tracking data blocks in a shared resource where the data blocks are destined for cryptographic processing is referred to herein as a buffer pointer table. Any mechanism for allocating the pointers in the buffer pointer table to various data blocks is referred to herein as an input controller 421.

When the input controller 421 has assigned data pointers from the buffer pointer table 451, a load distribution unit 461 can select data from the buffer pointer table entries. The order for all data on a particular port is maintained since the load distribution unit can be configured to select data in order from a single buffer pointer table 451. According to various embodiments, load distribution unit 461 can select data referenced by the buffer pointer table 451 using a variety of mechanisms. In one example, the load distribution unit 461 selects data from ports that have consumed all allocated buffer space. The load distribution unit can also select data entries if the data entries are entire packets. In another example, load distribution unit can select data in round-robin fashion. The load distribution unit also be configured to identify data associated with cryptographic processing.

As will be appreciated, a data destined for cryptographic processing is often processed based on information associated with the data block. In one example, a data block is processed after obtaining security association information associated with the data block. The security association information includes keys such as session keys, initialization vectors, and the particular algorithms needed to process the data. Security association data is often determined using combinations of source and destination addresses and source and destination port numbers. For example, a packet with a source of A and a destination of B may be determined to need triple DES processing, MD5 authentication, and a session key available to the cryptographic processing core from a particular memory address. The load distribution unit 461 identifies information needed for cryptographic processing of the data and provides a pointer to the information. In many instances, the pointer is a pointer to the header of a packet stored in the input buffer 441.

According to various embodiments, the load distribution unit 461 passes information to target list 471. In one example, target list 471 includes multiple lists, each list associated with a particular data path. One list may be associated with bypass data that should be passed through the cryptography accelerator substantially without processing. Other lists may be associated with public key operation data paths. In one example, a modular exponentiation unit list is provided for performing modulus operations on data in the input buffer 441. Still other lists include pointers to data blocks in buffer memory 441 requiring processing by one of the cryptographic accelerator course. The data pointer lists are associated with a header pointer list that identifies how to derive information such as security association information for processing the data corresponding to the pointers in the data pointer list. The output controller 481 is responsible for forwarding data associated with the pointers in the target list to the various data paths. Typically, data associated with each of the lists in the target list 471 is pulled in round-robin fashion. In one example data associated with each list gets the same amount of bandwidth out of the input buffer 441.

Figure 5:
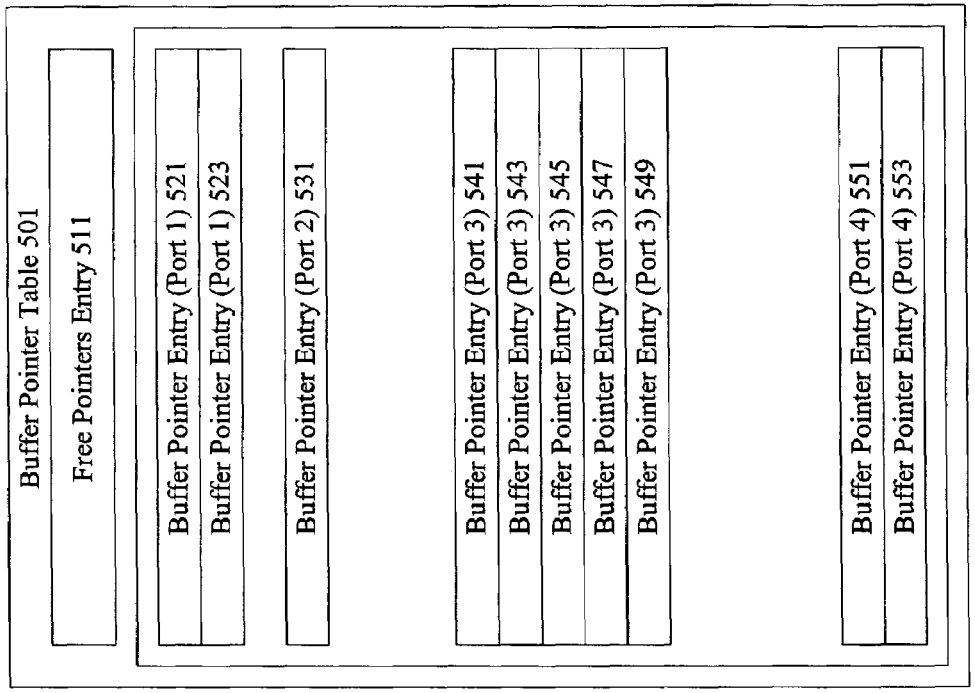
FIG. 5 is a diagrammatic representation showing a pointer buffer list.

The input buffer allows storage of information for use in various cryptographic operations as well as the allocation of memory to various ports as provided by the buffer pointer table 451. FIG. 5 is a diagrammatic representation, of a buffer pointer table 501. According to various embodiments, the buffer pointer table 501 includes a free pointers entry 511 listing the available free pointers associated with free blocks in the input buffer memory. In one example, blocks of pointers are allocated to each of the various ports in the data input unit. For example, buffer pointer entry 521 and 523 are associated with port one. Buffer pointer entry 531 is associated with port two. Buffer pointer entries 541, 543, 545, 547, and 549 are associated with port three. Buffer pointer entries 551 and 553 are associated with port 4. As long as free pointers are available for a particular port, an input controller can continue to pull data from the particular port, store the data in input buffer memory, and assign an available pointer associated with the port to the data block. However, when no free pointers are available for a particular port, the input controller no longer pulls data from that port. The port is blocked until space is made available in the input buffer as represented by the buffer pointer table.

It should be noted that much of the load distribution processing and the data path decision processing is performed using pointers to blocks of memory in the input buffer. In a cryptography processing context, this provides important benefits including the capability to process data and associated security association information along data paths where the data paths can be implemented substantially without data path buffers.

Figure 6:
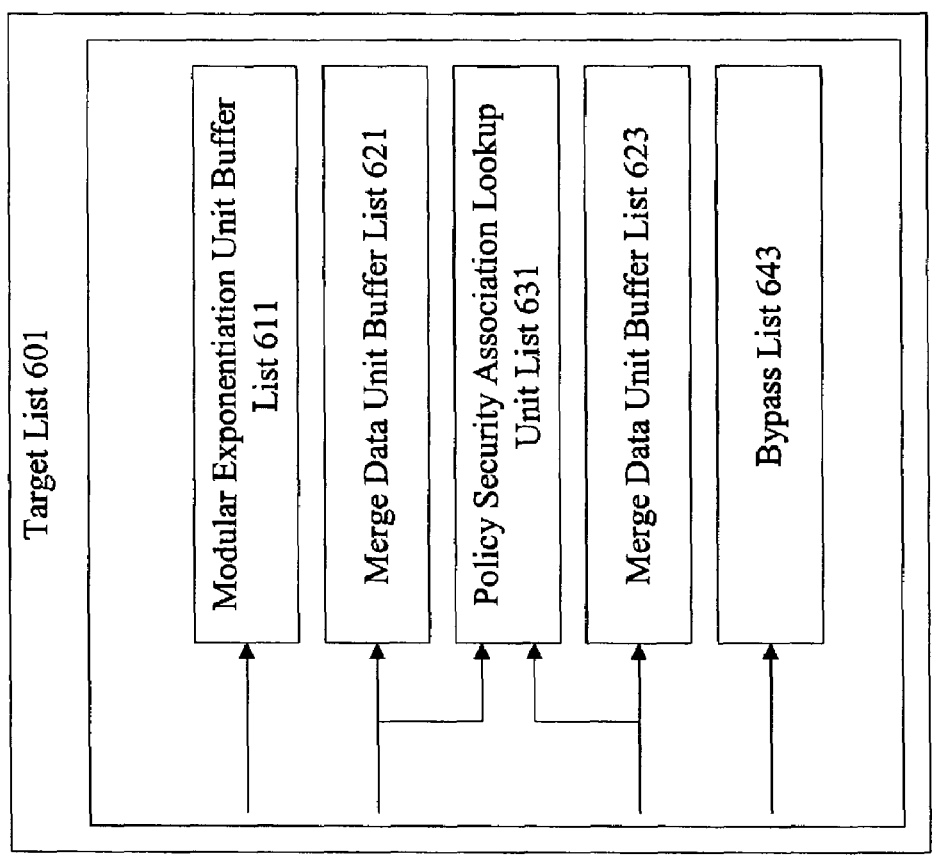
FIG. 6 is a diagrammatic representation showing a target list.

FIG. 6 is a diagrammatic representation of a target list. According to various embodiments, target list 601 includes multiple lists associated with various data paths. In one example, target list 601 includes a bypass list 643 associated with data to be passed through the cryptography accelerator without cryptographic processing. A modular exponentiation buffer list 611 is provided for public key processing of data. According to various embodiments, merge data unit buffer list 621 and merge data unit buffer list 623 are provided for data to be forwarded to cryptographic processing cores. Merge data unit buffer list 621 and 623 are associated with pointers to data that will be merged with security association information before cryptographic processing is performed.

Consequently, merge data unit buffer lists 621 and 623 are linked to policy security association lookup unit header list 631. When a pointer is provided to merge data unit buffer list 621, a pointer is also provided to policy security association lookup unit header list 631. The merge data unit buffer list 621 pointer allows later combination of data with security association information extracted from a policy security association lookup unit. When the data is combined with the security association information, the data can be processed using one of a number of cryptographic processing cores.

Figure 7:
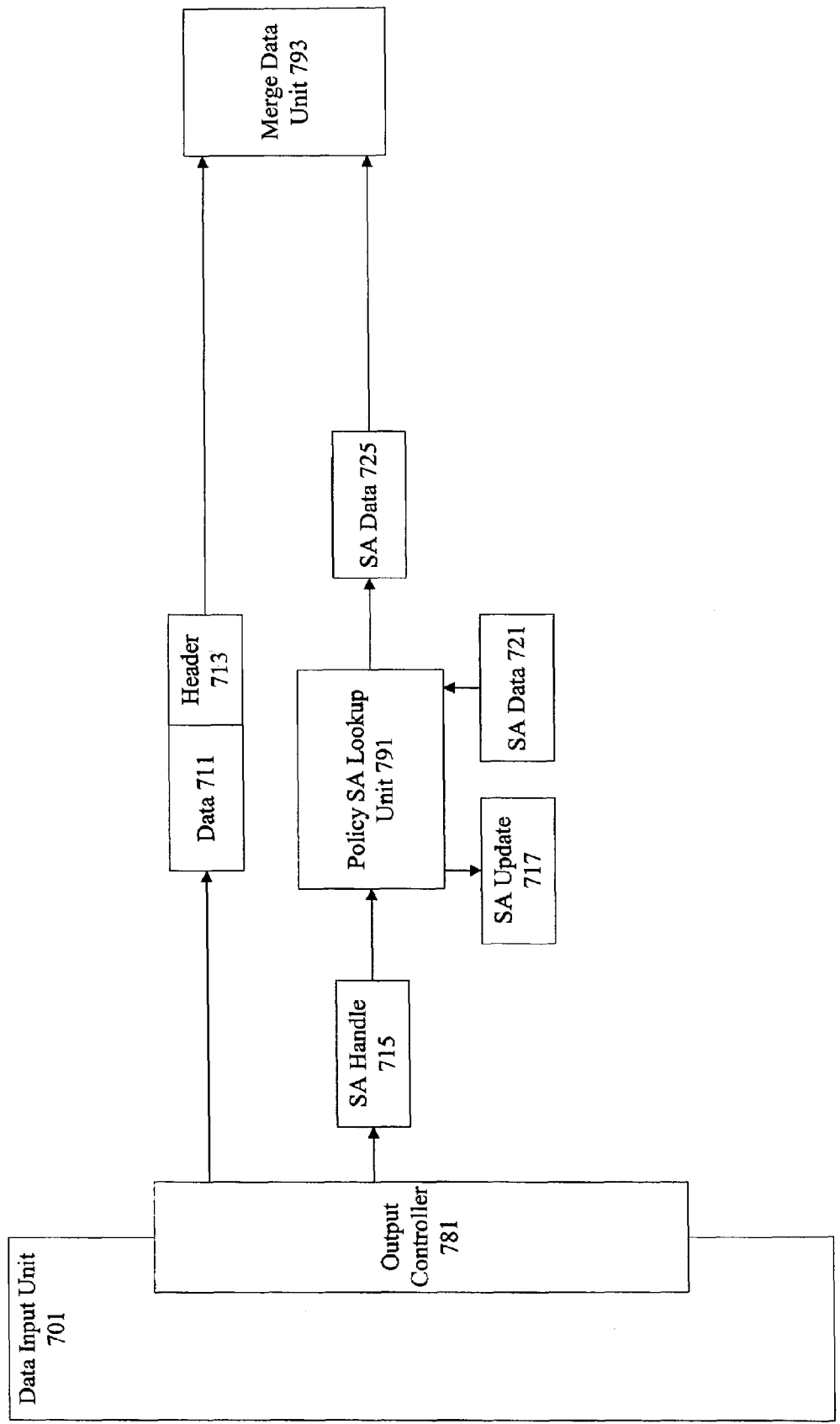
FIG. 7 is a diagrammatic representation showing data handling associated with a policy security association lookup unit.

FIG. 7 is a diagrammatic representation of data passed to a merge data unit. According to various embodiments, the output controller 781 associated with the data input unit 701 provides data 711 and 713 to a merge data unit 793. However, before the data 711 and header 713 can be processed using one of a number of cryptographic processing cores, the data typically is combined with security association information. According to various embodiments, the security association information is derived by a policy security association lookup unit. In one embodiment, the policy security association lookup unit reads information from memory and prepends information to data 711 and header 713. The location in memory of the security association data structure can be specified directly or by identifiers passed by the output controller 781. In one example the output controller 781 passes a security association handle 715 to the policy security association lookup unit 791.

In one example, the policy security association lookup unit 791 uses the information in the security association handle 715 to identify security association information. The information identified can be used for both inbound and outbound packets to allow the packets to be classified into flows. In one instance, the security association handle 715 includes up to 2 k of the header of the associated packet. The policy security association lookup unit then issues a security association update 717 to modify data such as sequence numbers associated with a flow.

The policy security association lookup unit 791 acquires security association data 721 and passes the security association data 725 to a merge data unit 793. The merge data unit 793 combines the security association data 723 with the data 711 and header 713. It should be noted that the policy security association lookup unit processing may vary depending on whether the packet is an inbound packet or an outbound packet. For an outbound packet, the policy security association lookup unit may also be responsible for determining header information such as outer IP header information. For an inbound packet, the outer IP header information is included in the data 711 and header information 713. Various types of error checking can also be performed by the policy security association lookup unit 791 to determine that the flow referenced by a security association handle 715 is a valid one.

It should be noted that each merge data unit 793 can then pass the combined data to one of multiple cryptography processing core data paths. In one example, two merge data units are provided in a cryptography accelerator having a data input unit and eight processing cores. The two merge data units are also associated with a single policy security association lookup unit. Each merge data is coupled to four cryptographic cores. In some examples, each merge data unit would select one of the four cryptographic processing cores to handle data based on load.

Figure 8:
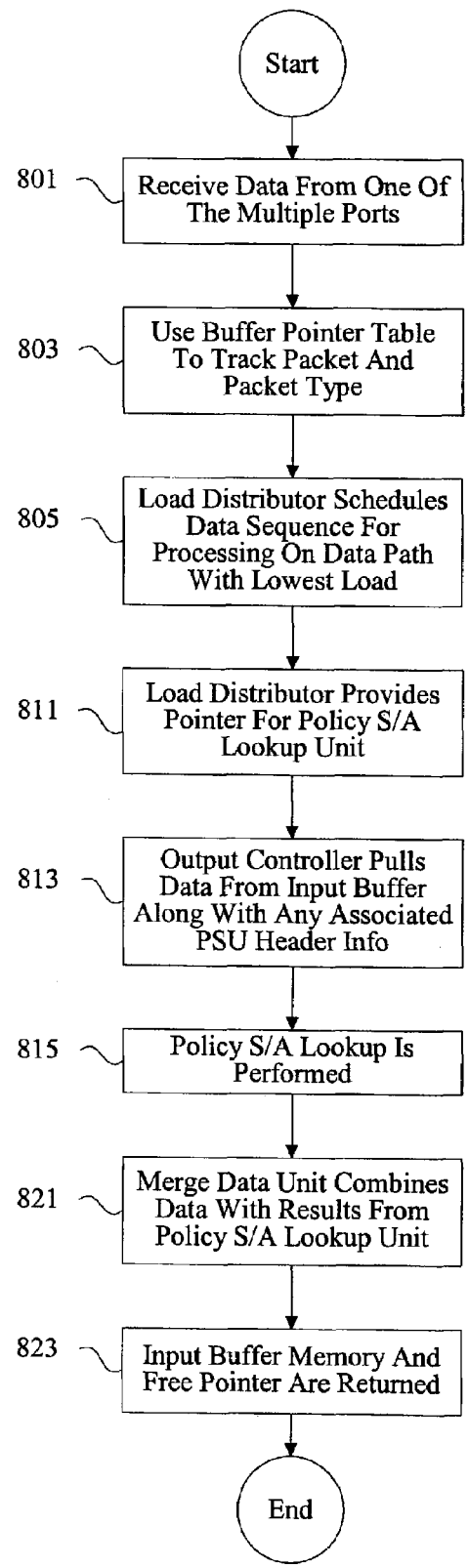
FIG. 8 is a flow process diagram showing packet processing at an input interface.

FIG. 8 is a flow process diagram showing data handling in the cryptography accelerator. At 801, data is received from one of any number of input ports associated with the cryptography accelerator. As noted above, each port may be configured to handle different types of traffic such as streaming, packet, large packet, or memory mapped data. At 803, a free buffer is pointer table is used to track the packet and the packet type. It should be noted that data is typically pulled in round-robin fashion from one of the input ports as long as free pointers are available in the buffer pointer table. According to various embodiments, blocks of pointers are allocated to each of the input ports. In this manner, the system designer can allocate input buffer memory associated with the pointers to each of the various input ports based on the needs and requirements of each port or the corresponding traffic. At 805, the load distributor schedules the data sequence for processing on a data path having the lowest load.

According to various embodiments, the load distributor schedules data sequences by scheduling the pointers in the buffer pointer table. At 811, the load distributor provides a pointer to a policy security association lookup unit list. It should be noted that some data sequences may require no cryptographic core processing and may instead be provided to a bypass list or a public key processing list. At 813, the output controller pulls data from the input buffer along with any associated policy security association lookup unit header information. The output controller pulls data from the input buffer based on pointers provided in a target list. At 815, the policy security association lookup is performed using information such as header information associated with the data sequence. At 821, a merge data unit combines the data sequence with the results of a policy security association lookup. At 823, input buffer memory and any associated free pointers are returned.

Figure 9:
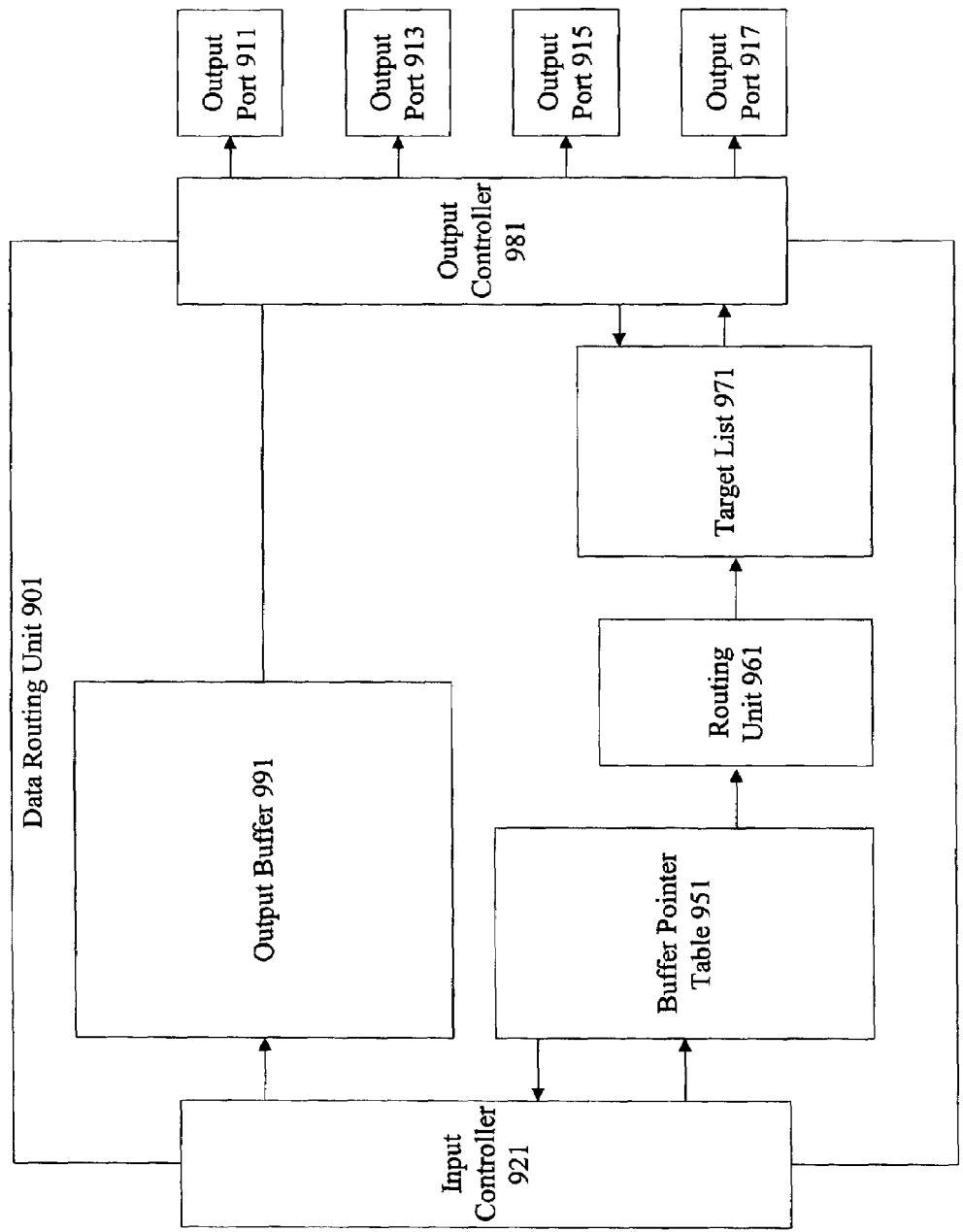
FIG. 9 is a diagrammatic representation showing a data routing unit.

FIG. 9 is a diagrammatic representation of a data routing unit 901. As noted above, the data input unit provides the input interface for a cryptography accelerator while the data routing unit provides the output interface for the cryptography accelerator. According to various embodiments, the data routing unit manages the ordering of cryptographically processed data for the various egress output ports. The input controller 921 is coupled to a variety of data paths such as bypass, public key processing, and cryptographic core processing data paths. According to various embodiments, data blocks in a data sequence may be received out of order by an input controller as several data paths may be associated with cryptographic processing cores. For example, blocks 1, 2, and 4 may be received through a first data path and blocks 3 and 5 may be received through a second data path. The data routing unit is configured to order the data blocks and provide them to the appropriate output port.

According to various embodiments, the input controller 921 writes data blocks to buffer memory and data block pointers to a buffer pointer table 951 in the order that the input controller receives them. In one example, pointers to blocks 1, 2, and 4 may be placed into a first port buffer list while pointers to blocks 3 and 5 may be placed in a second port buffer list. A routing unit 961 recognizes the ordering and pulls pointers in order and places the pointers in the target list 971. In many implementations, the target list 971 includes lists of pointers each associated with the various output ports. In one example, lists of pointers are provided in target list 971. In one example, four lists of pointers correspond to output ports 911, 913, 915, and 917. Each pointer in the target list 971 corresponds to a block in output buffer 991. It should be noted that in the data input unit, the pointers in the buffer pointer table are allocable to the various input ports based on the particular needs and requirements of the input ports.

In the data routing unit, however, the pointers in the target list 971 are allocable to the various output ports based upon the needs and requirements of the various output ports. In one example, output port 911 may be configured to support large packets. Consequently, the large number of output buffer memory manager 991 would be allocated to output port 911. In one example, the routing unit 961 would pull a first block pointer associated with a flow and place the pointer into a buffer list associated with a Gigabit MAC output port. The routing unit 961 would not pull another block from that particular flow until the second block pointer is pulled. In this manner, the routing unit 961 can pull data blocks in order from the buffer pointer table even if the blocks of data came from different data paths in the cryptographic accelerator.

It should be noted that although the blocks on a particular data path will typically be in order, the blocks received from multiple data paths by the input controller will not necessarily be in order. That is, blocks 3 and 5 in a sequence may be received along a data path before blocks 1, 2 and 4 are received from another data path. The routing unit 961 pulls pointers to data blocks in order from the buffer pointer table and places them in an output port list in the target list 971. The output controller 981 uses the pointers in the target list 971 to identify data blocks in the output buffer 991 to forward to the output ports.

Figure 10:
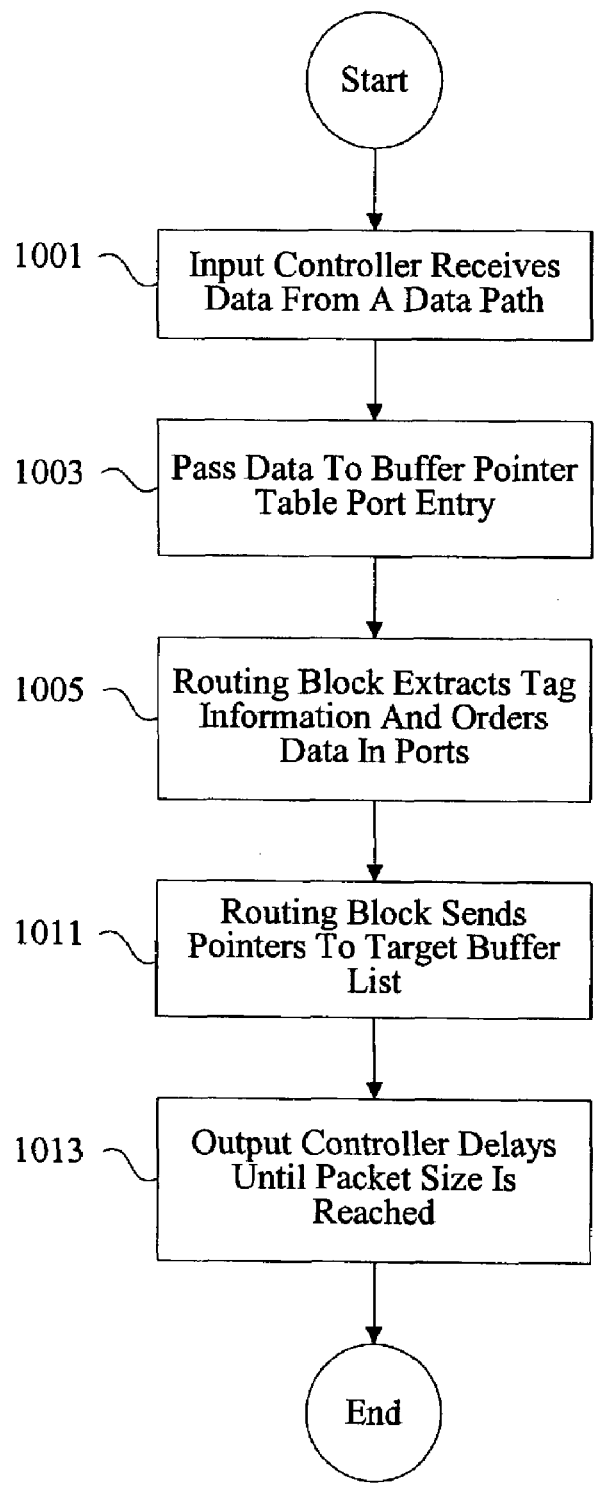
FIG. 10 is a flow process diagram showing packet processing at an output interface.

FIG. 10 is a flow process diagram showing data handling at an output interface associated with the cryptography accelerator. At 1001, input controller receives data from a data path. At 1003, data is written to the output buffer 991 and the pointer is written to the buffer pointer table 951. The routing unit 961 pulls data blocks in order from the buffer pointer table 951 at 1005. At 1011, the routing block forwards the pointers to the target buffer list upon determining that pointers are available in the target list. At 1013, the output controller may immediately forward data associated with the pointers in the target list or may wait until a packet size is reached before forwarding data out through a particular port.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A cryptography accelerator, comprising:
a plurality of input ports configured to receive data comprising header information and data blocks;
a plurality of cryptographic processing cores, each cryptographic processing core having a plurality of data paths;
an input buffer coupled to the plurality of input ports and cryptographic processing cores, wherein the input buffer is shared by the plurality of input ports and the plurality of data paths associated with each cryptographic processing core in the plurality of cryptographic processing cores;

an input controller coupled to the plurality of input ports, wherein the input controller dynamically allocates resources of the input buffer to the plurality of input ports and to the plurality of data paths associated with each cryptographic processing core in the plurality of cryptographic processing cores; and wherein the shared input buffer is dynamically allocable by varying a number of entries in a buffer pointer table allocated to each of the plurality of ports.

2. The cryptography accelerator of claim 1, wherein policy and security association information is extracted based on source and destination addresses and source and destination ports of the data blocks.

3. The cryptography accelerator of claim 1, wherein policy and security association information comprises key and algorithm information.

4. The cryptography accelerator of claim 1, wherein the plurality of input ports comprise a streaming interface port.

5. The cryptography accelerator of claim 4, wherein the plurality of input ports further comprise a memory mapped port.

6. The cryptography accelerator of claim 1, wherein the buffer pointer table comprises a plurality of pointers.

7. The cryptographic accelerator of claim 1, further comprising:

policy security association lookup circuitry configured to receive header information and determine policy and security association information associated with the data blocks, wherein the policy and security association information is forwarded with the data blocks to cryptographic processing cores.

8. The cryptography accelerator of claim 7, wherein the policy security association lookup circuitry receives a pointer to header information.

9. A cryptography accelerator comprising:

a plurality of input ports configured to receive data comprising header information and data blocks;

a plurality of cryptographic processing cores; an input buffer coupled to the plurality of input ports and cryptographic processing cores, wherein the input buffer is shared by the plurality of input ports and the plurality of cryptographic processing cores;

an input controller coupled to the plurality of input ports, wherein the input controller dynamically allocates resources of the input buffer to the plurality of input ports and the plurality of cryptographic processing cores; and a buffer pointer table associated with the plurality of input ports, the buffer pointer table having a plurality of entries configured to hold header information from the plurality of input ports, the plurality of entries referencing data blocks in the shared input buffer.

10. The cryptography accelerator of claim 9, further comprising:

a data input unit load distributor configured to select entries from the buffer pointer table.

11. The cryptography accelerator of claim 10, further comprising:

an output controller configured to receive buffer pointer table entries from the load distributor, pull data blocks corresponding to the entries from the input buffer, and forward the data blocks to a plurality of data paths associated with the plurality of cryptographic processing cores.

12. The cryptography accelerator of claim 11, further comprising a merge data unit coupled to the output controller and the policy security association lookup circuitry, wherein the merge data unit is configured to wait for the policy and security association information and the corresponding data block before forwarding the policy and security association information along with the data block to a cryptographic processing core.

13. The cryptographic accelerator of claim 7, wherein the input controller is configured to write data blocks from the plurality of input ports into the input buffer and write entries corresponding to the data blocks into the buffer pointer table.

14. A method for data handling in a cryptography accelerator having a plurality of input ports and a plurality of cryptographic processing cores, comprising:

each cryptographic processing core having a plurality of data paths;

receiving data at the plurality of input ports; dynamically allocating space in an input buffer shared by the plurality of input ports and the plurality of data paths associated with each cryptographic processing core in the plurality of cryptographic processing cores to the received data; and allocating space in the shared input buffer to data used by the a data path associated a cryptographic processing core to process the received data; and wherein the input buffer is dynamically allocated by varying the number of entries in a buffer pointer table allocated to each of the plurality of input ports.

15. The method of claim 14, wherein the shared resource is a buffer shared by the plurality of input ports.

16. The method of claim 14, wherein the references are pointers to entries in the shared resource.

17. The method of claim 16, wherein the references are included in a buffer pointer table.

18. The method of claim 17, wherein the shared resource can be allocated based on needs of particular input ports.

19. A method for data handling in a cryptography accelerator having a plurality of input ports and a plurality of cryptographic processing cores comprising:

receiving data at the plurality of input ports;

dynamically allocating space in an input buffer shared by the plurality of input ports and the plurality of cryptographic processing cores to the received data;

allocating space in the shared input buffer to data used by the cryptographic processing core to process the received data;

providing references to the received data in the shared input buffer, wherein the references identify the received data as well as the type of the received data;

performing a policy security association lookup to determine policy and security association information associated with the received data; and forwarding the received data along with policy and security association to the plurality of cryptographic processing cores.

20. A cryptography accelerator, comprising:

a plurality of input ports configured to receive data comprising header information and data blocks;

a plurality of cryptographic processing cores, each cryptographic processing core having a plurality of data paths;

a bypass line coupling the plurality of input ports to a plurality of output ports;

an input buffer coupled to the plurality of input ports and cryptographic processing cores, wherein the input buffer is shared by the plurality of input ports and the plurality of data paths associated with each cryptographic processing core in the plurality of cryptographic processing cores;

an input controller coupled to the plurality of input ports, wherein the input controller dynamically allocates resources of the input buffer to the plurality of input ports and to the plurality of data paths associated with each cryptographic processing core in the plurality of cryptographic processing cores; and a target list having a bypass list associated with data blocks to be passed through the cryptography accelerator without cryptographic processing.

21. A cryptography accelerator, comprising:

a plurality of input ports configured to receive data comprising header information and data blocks;

a plurality of cryptographic processing cores;

a bypass line coupling the plurality of input ports to a plurality of output ports;

an input buffer coupled to the plurality of input ports and cryptographic processing cores, wherein the input buffer is shared by the plurality of input ports and the plurality of cryptographic processing cores and wherein the input buffer is dynamically allocated by varying the number of entries in a buffer pointer table allocated to each of the plurality of input ports;

an input controller coupled to the plurality of input ports, wherein the input controller dynamically allocates resources of the input buffer to the plurality of input ports and the plurality of cryptographic processing cores; and a target list having a bypass list associated with data blocks to be passed through the cryptography accelerator without cryptographic processing.

\* \* \* \* \*